United States Patent [19]

Marcantonio

[11] Patent Number: 5,227,973
[45] Date of Patent: Jul. 13, 1993

[54] CONTROL ARBITRATION SYSTEM FOR A MOBILE ROBOT VEHICLE

[75] Inventor: Angelo R. Marcantonio, Princeton, N.J.

[73] Assignee: Siemens Corporate Research, Inc., Princeton, N.J.

[21] Appl. No.: 661,771

[22] Filed: Feb. 26, 1991

[51] Int. Cl.⁵ ............................................. G06F 15/50
[52] U.S. Cl. ........................... 364/424.02; 318/568.12
[58] Field of Search ............................... 364/424.02; 180/167-169; 318/568.12

[56] References Cited

U.S. PATENT DOCUMENTS

| | | | |
|---|---|---|---|
| 4,628,453 | 12/1986 | Kamejima et al. | 364/424 |
| 4,636,996 | 1/1987 | Tsuji | 367/93 |
| 4,638,445 | 1/1987 | Mattaboni | 364/513 |
| 4,674,048 | 6/1987 | Okumura | 364/424 |
| 4,674,057 | 6/1987 | Caughman et al. | 364/513 |
| 4,698,775 | 10/1987 | Koch et al. | 364/478 |
| 4,718,023 | 1/1988 | Arora | 364/513 |
| 4,746,977 | 5/1988 | White | 358/103 |
| 4,751,658 | 6/1988 | Kadonoff et al. | 364/513 |
| 4,777,416 | 10/1988 | George, II et al. | 318/568 |
| 4,821,192 | 4/1989 | Taivalkoski | 364/424.02 |
| 4,866,617 | 9/1989 | Matsuda et al. | 364/424.02 |
| 4,888,708 | 12/1989 | Brantmark et al. | 364/513 |
| 5,073,749 | 12/1991 | Kanayama | 318/587 |
| 5,111,401 | 5/1992 | Everett, Jr. et al. | 364/424.02 |

FOREIGN PATENT DOCUMENTS 8707009 11/1987 PCT Int'l Appl.
8707056 11/1987 PCT Int'l Appl.

OTHER PUBLICATIONS

Lumelsky et al., "Dynamic Path Planning for a Mobile Automation with Limited Information on the Environment", IEEE 1986, 0018-9286/86/1100.

Crowley, "Navigation for an Intelligent Mobile Robot", IEEE 1985, 0882-4967/85/0300.

*Primary Examiner*—Thomas G. Black
*Attorney, Agent, or Firm*—Adel A. Ahmed

[57] ABSTRACT

A method of arbitrating between various modes of operation involved in controlling the movement of a robot vehicle from a current position in which the modes are given a sequential priority in such manner that no mode can be activated unless all previous modes in the sequence are not actuated. The sequential priority is abort command, joystick control, object avoidance, missed target procedure, and dead reckoning.

3 Claims, 3 Drawing Sheets

CONTROL ARBITRATION SYSTEM FOR A MOBILE ROBOT VEHICLE

FIELD OF THE INVENTION

This invention is in the field of robot vehicle control.

BACKGROUND OF THE INVENTION

Mobile robot vehicles are generally equipped with means for changing the heading of the vehicle at a rate based on the heading error, and means for changing the speed of the vehicle at a rate based on its distance from a target location to which it is being directed. After being supplied with an initial coordinate position and an initial heading or orientation, the vehicle supplies signals representing the current position and heading as the vehicle moves. In order that obstacles may be avoided, the vehicle may be equipped with ultrasonic means for indicating the ranges of obstacles in each of a plurality of contiguous sectors lying within 180°.

A master controller designates the coordinates of a target location and provides the signals for controlling the heading and speed of the vehicle. It also compares the current position of the vehicle with the target location to determine whether the target location has been reached. If not, the heading of the vehicle can be controlled in several modes e.g. by a joystick, by an obstacle avoidance procedure or by a dead reckoning procedure. If the distance between the vehicle and the target location is increasing, and the vehicle is not avoiding an obstacle or under joystick control, the vehicle can be operated in a missed target mode and halted as this indicates that the target location has been missed. Each of these modes of operation has been used, but their use has not been arbitrated or selected in an advantageous manner.

BRIEF SUMMARY OF AN EMBODIMENT OF THE INVENTION

In accordance with this invention, the modes halt vehicle (abort), joystick control, obstacle avoidance, missed target and dead reckoning procedure are assigned a priority in the order named so that the movement of the vehicle can only be controlled in response to a mode if all the previous ones are not activated. Thus, if the joystick is providing signals as to heading, the obstacle avoidance mode, the dead reckoning mode and the missed target mode are not active.

Furthermore, after any mode is activated, a check is made to see if a target location is still being asserted, and the ultrasonic data and the current position are acquired. A check is then made to see if the vehicle has reached the target location. If so, the vehicle is halted. If not, the distance and heading of the target location are computed and new steering and drive signals for the vehicle are derived. The modes are again examined in sequence to see which one is activated. The mode used can be the same as previously used or a different one. These sequential interrogations of the modes of control to see which one is active are done at a rapid rate so that changing from one mode to another or movement toward a new target location can be rapidly effected.

DETAILED DESCRIPTION OF THE DRAWINGS

Figure 1:
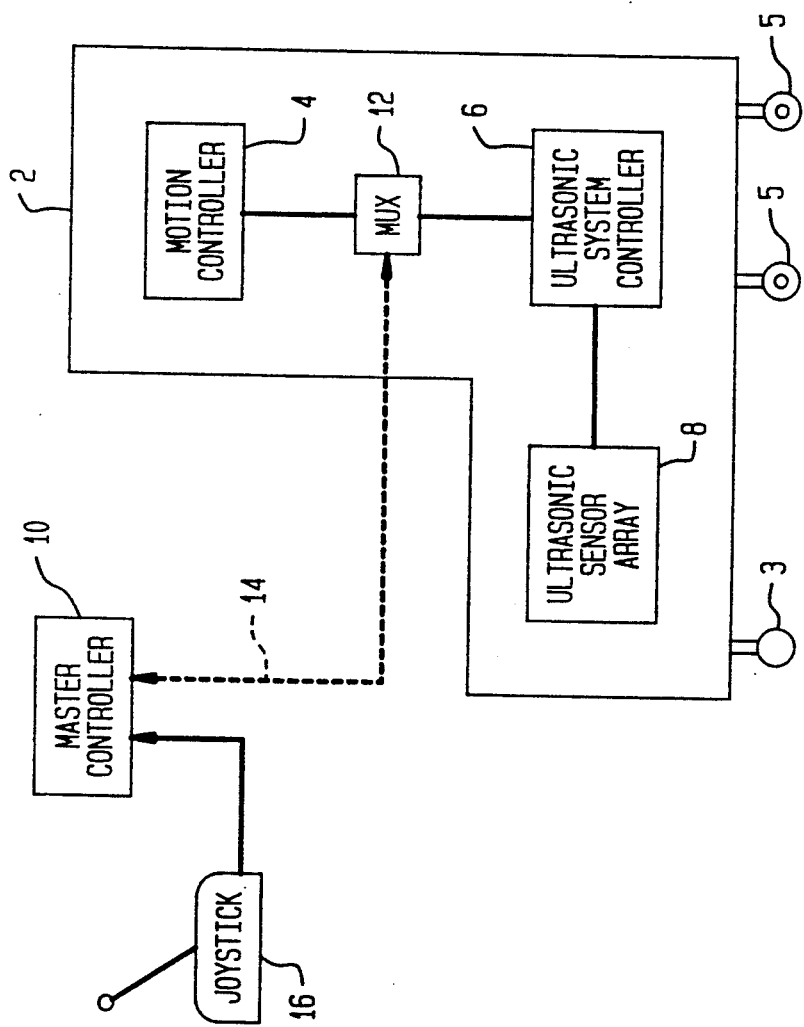
FIG. 1 is a block diagram of the control apparatus for a mobile robot vehicle.

FIG. 1 shows a mobile robot vehicle 2 of the prior art having a motion controller 4 and an ultrasonic system controller 6 for an ultrasonic sensor array 8. These controllers are slaves of a remote master controller 10 to which they are coupled via a multiplexer 12 and a command/data link 14. The link 14 may conduct signals via cable, or by modulated radio frequency. In addition, a joystick controller 16 that outputs heading signals is coupled to the master controller 10. Also note that in a typical mobile robot vehicle 2, the master controller 10 and joystick 16 are physically separated from the actual vehicle 2. Also, in this illustration (see FIG. 3), the ultrasonic system controller 6 is located on top of the robot vehicle 2, and the motion controller 4 is located in the base of the robot vehicle 2.

Although not shown, the motion controller 4 contains means that transforms digital steering signals from the master controller 10 into analog signals for driving an electrical steering motor, not shown, and means that transforms digital drive signals from the master controller 10 into analog signals for driving an electrical propulsion motor, not shown. These signals are respectively introduced into servo loops for the motors. The controller 4 also contains means for producing a signal indicating the heading of the robot vehicle. The signal is derived by adding changes in direction to an initial heading. In addition, a signal indicating the position of the robot vehicle is derived by adding movements along respective coordinate axes to the coordinates of an initial position. The analog steering signals are introduced into the servo loop involving the steering motor so as to make the rate at which it changes the heading of the vehicle a function of the heading error. The analog driving signals are introduced into a servo loop involving the driving motor so as to make the speed at which it moves the vehicle decrease in a proportional manner as the distance between the vehicle and the target location decreases.

A plurality of ultrasonic sensors 1 (see FIG. 3), are arranged in a horizontal semicircle on one side of the robot vehicle 2, to form an ultrasonic sensor array 8, in this example. Each sensor may be comprised of means for transmitting ultrasonic pulses within a given sector and means for noting the times between transmitted pulses and pulses reflected from an obstacle in its sector, for deriving signals indicative of the respective ranges of the obstacles.

Figure 2:
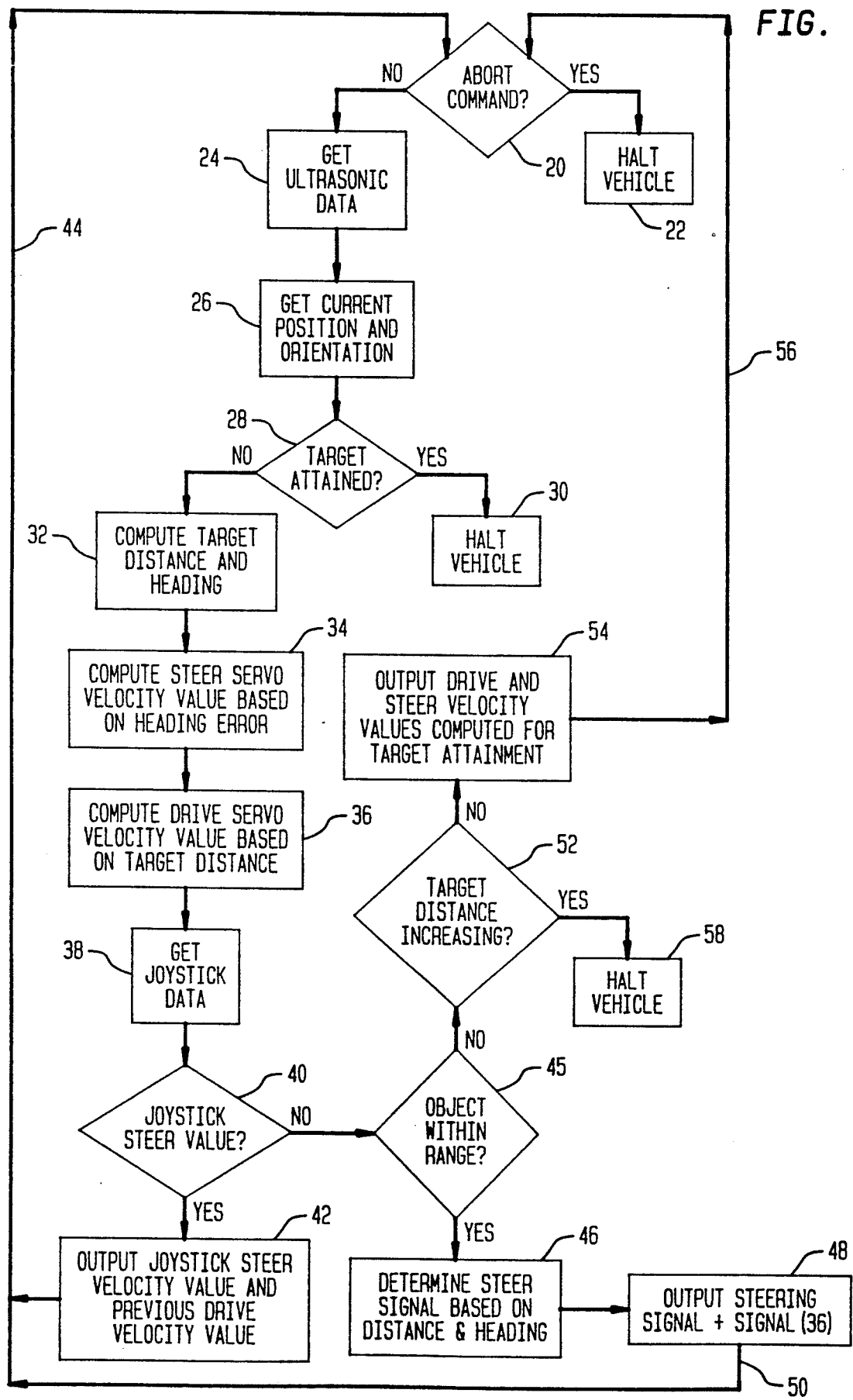
FIG. 2 is a flowchart incorporating the arbitration procedure of this invention.

Reference is now made to the flowchart of FIG. 2 for a description of the manner in which the known robot vehicle 2 just described may be controlled in accordance with this invention. In effect, the flowchart includes the programming for vehicle 2.

A determination is made via program block or step 20 as to whether an abort command is being asserted by the master controller 10. If so, the vehicle is halted, step 22, and the control loop is exited. However, if a location is asserted, the following functions are carried out. Ultrasonic data, in this example, is requested by the master controller 10 from the ultrasonic system controller 6 so as to obtain information as to the ranges of obstacles in the respective sectors referred to, step 24. The master controller 10 also obtains data from the movement or motion controller 4 as to the current heading and coordinate position of the vehicle 2, step 26. From this last data and the target location asserted by the step 20, a determination is made by a step 28 as to whether the vehicle 2 has reached the target location.

If the vehicle 2 has reached the target location, it is halted, step 30, but if it has not reached the target location, the functions are carried out as described below.

Computation is made, step 32, of the heading of the asserted target location from the current position of the vehicle 2, and of the distance between the target location and the vehicle 2.

A steering signal indicating the steer servo velocity that is based on the heading error of the vehicle is derived, step 34, and a driving signal indicating the speed the vehicle is to have is derived, step 36. The driving signal amplitude is based on the distance between the target location and the vehicle 2.

Any data supplied by the joystick 16 is obtained by the master-controller 10, step 38, and a determination is made, step 40, as to whether any steering data is present. If it is, the steering signal and the drive signal of step 36 are supplied, step 42, to the movement controller 4. As indicated via line 44, the procedure then loops back to step 20 so as to go through the procedure just described again.

Whenever the step 40 indicates that the joystick 16 is not asserting a steering signal, a determination is made via step 45 as to whether any suitable obstacle avoidance procedure, step 46, should be followed. Step 45 examines the ultrasonic data obtained by step 24 to determine whether there is an obstacle in the present course between the vehicle and the target location. If there is, the obstacle avoidance procedure of step 46 is followed to derive an output steering signal based on the obstacle distance and heading, and the steering signal from step 34. The steering signal from step 46 and the driving signal from step 36 are then supplied, via step 48, to the movement controller 4. The procedure then loops back to step 20 as indicated by line 50. The avoidance procedure is followed until a command is issued by the master controller 10 indicating abort, step 20, no obstacle is within range, step 45, the vehicle reaches the target location as indicated by the step 28 and is halted at the step 30 or until joystick steering takes over as indicated by a true output of step 40.

If step 40 indicates that joystick control is not active, and step 45 indicates that the obstacle avoidance procedure is not active, a determination is made in step 52 as to whether the distance between the vehicle and the target location is increasing. If it is not increasing, a dead reckoning procedure is followed, step 54, in which the steering signal computed in step 34 and the driving signal computed in step 36 are supplied to the movement or motion controller 4. The procedure then loops back to step 20 as indicated by the line 56. The dead reckoning procedure is followed until the target location is attained as indicated by step 28.

Alternatively, if step 52 indicates that the distance between the vehicle and the asserted target location is increasing, the target has been missed, whereby the vehicle is halted, step 58, and the control exited. Once the vehicle is halted, a new command from the master controller 10 is required to direct the vehicle 2 to a target location.

It can thus be seen that the procedures diagramed in FIG. 2 are comprised of a major loop that starts at step 20 and passes through steps 28, 40, 45 and 52 and back to step 20, and three minor loops indicated by the lines 44, 50, and 56. This is an arbitration procedure that sets the priorities of the modes of operation in the following order: abort command asserted as the first priority, joystick control as the second priority, obstacle avoidance as the third priority, missed target abort as the fourth priority, and target attainment as the fifth priority. When a mode is asserted, it is continued at least during the time required to pass through the main loop in which it appears.

Figure 3:
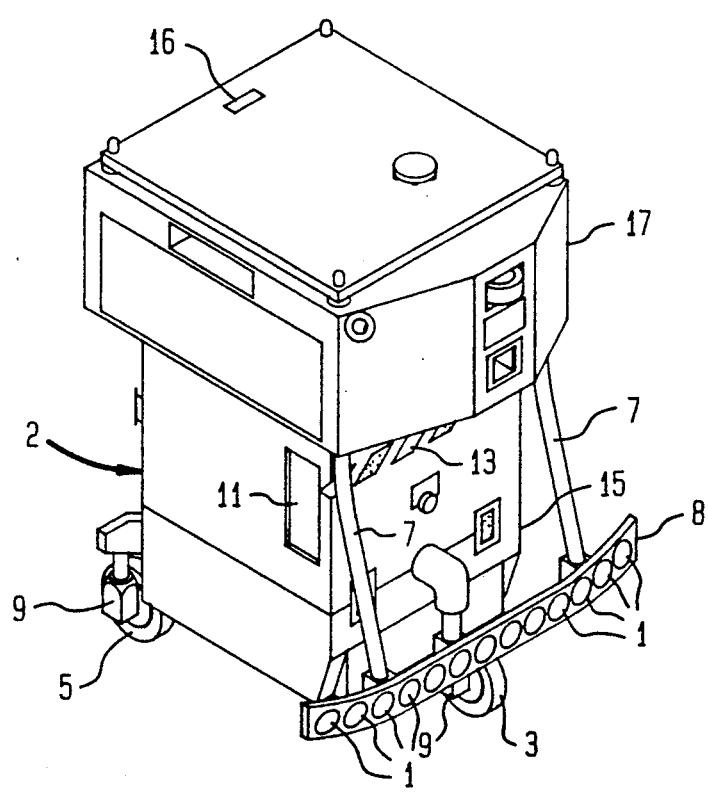
FIG. 3 shows a simplified pictorial of a typical robot vehicle including the present invention.

As shown in FIG. 3, a typical mobile robot vehicle 2 incorporating the invention includes an ultrasonic array 8. The array 8 includes a plurality of ultrasonic transducers 1, thirteen in this example. A forwardmost wheel 3 is located in the front of the vehicle 2, and two rearwardmost wheels 5 (one is not shown) are located at the back of the vehicle 2. All three wheels 3, 5 drive and steer the vehicle 2. Brackets 7 are used for securing the ultrasonic array 8 to the vehicle 2 as shown. Electric drive motors 9 may be connected to each of the wheels 3 and 5, or only to wheel 3, for example. Appropriate gearing and drive mechanisms (not shown) are included for driving and turning wheels 3, 5 in unison, as previously mentioned. A control panel 11, and warning lights 13 are located on lower housing 15. The ultrasound system controller 6 is located on top of vehicle 2. MUX 12, and motion controller 4 are also located in lower housing 15, in this example. The joystick 16 and master controller 17 are located separately from the housing 17, remote from vehicle 2, with communication therebetween being by cable or radio control, for example. Many other arrangements of the mechanical and electrical components are possible.

Although a number of embodiments of the invention have been shown and described herein for purposes of illustration, they are not meant to be limiting. Various modifications to these embodiments may occur to those of skill in the art, which the appended claims. For example, instead of an ultrasonic sensing system, other systems for detecting obstacles such as infra-red, radar, and so forth may be utilized.

What is claimed is:

1. A method for controlling a robot vehicle comprising the following steps in order:
   determining whether a target location is being asserted;
   determining whether the vehicle has reached a target location;
   arbitrating to determine which one of a plurality of modes of operation is to be asserted via a control hierarchy providing priority in descending order to said modes including abort command, joystick control, obstacle avoidance, missed target procedure, and dead reckoning;
   controlling the movement of the vehicle in accordance with the arbitrated asserted mode for a given period; and
   returning to the first step.

2. A method for controlling a robot vehicle having means for producing first signals representing its position and orientation, and second signals indicating the locations of obstacles, said method comprising the steps of:
   determining whether a target location is asserted or not;
   deriving from said first signals the position and orientation of the vehicle;

determining whether the vehicle has reached the target location;

computing the heading and distance to the target location from the position and orientation of the vehicle;

computing the steering velocity required to reach the target location from the position and orientation of the vehicle;

computing the drive velocity from the distance between the vehicle and the target location;

determining whether a joystick mode has been asserted;

steering the vehicle in accordance with the steering velocity provided by a joystick control, driving the vehicle at said drive velocity for a given period of time, and returning to said first step if the joystick mode is asserted;

determining whether o not an obstacle is present if the joystick mode is not asserted;

steering the vehicle in accordance with an obstacle avoidance procedure, driving it at said drive velocity for a given period, and returning to said first sep if an obstacle is present;

determining whether the distance between the vehicle and the target location is increasing;

driving the vehicle at said drive velocity and steering it at said steering velocity for a given period, if an obstacle is not present and said distance is not increasing;

halting the vehicle if said distance is increasing, the joystick mode is not asserted, and the obstacle avoidance procedure is not active; and halting the vehicle if it has reached the target location.

3. A method for controlling the movement of a robot vehicle comprising the steps of:

determining whether the location of a target to which the vehicle is to move is asserted;

obtaining information as to the current position and orientation of the vehicle;

determining whether the vehicle has reached the target;

halting the vehicle if it has reached the target;

computing the distance and heading of the target location, if the vehicle has not reached the target;

deriving a first signal for controlling the steering of the vehicle to the target;

deriving a second signal related to the distance of the vehicle from the target location for controlling the speed of the vehicle;

determining whether a joystick is asserting a steering signal;

controlling the speed of said vehicle with the second signal and the steering signal from said joystick, if present, and returning to the first determining step;

determining whether an obstacle is within the range of the target location, if the joystick is not asserting a steering signal;

moving said vehicle in accordance with an obstacle avoidance procedure if an obstacle is present, and returning thereafter to the first step;

moving said vehicle in response to said first and second signals if an obstacle is not present, and returning thereafter to the first step; and halting the vehicle and returning to the first determining step, if the distance between the vehicle and the target location is increasing and the vehicle is not moving in response to the joystick or the obstacle avoidance procedure.

* * * * *